W. J. TRETCH.
EXTENSOMETER.
APPLICATION FILED OCT. 13, 1917.
1,300,790.
Patented Apr. 15, 1919.
2 SHEETS—SHEET 1.
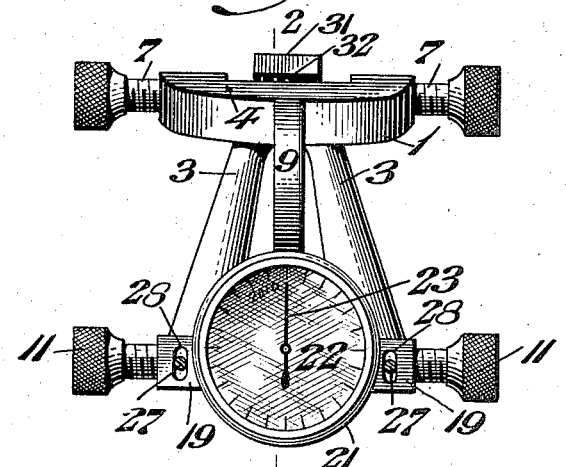
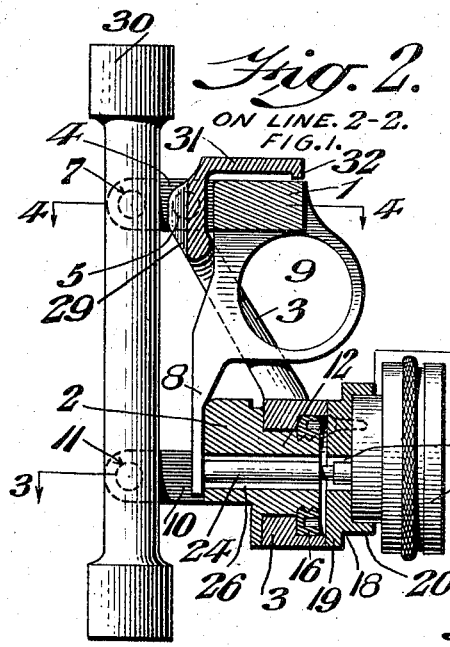
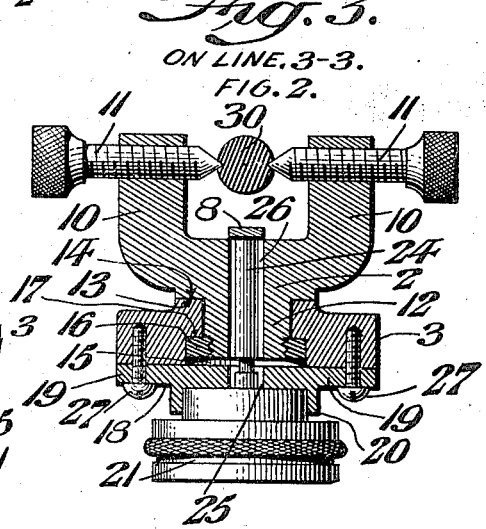
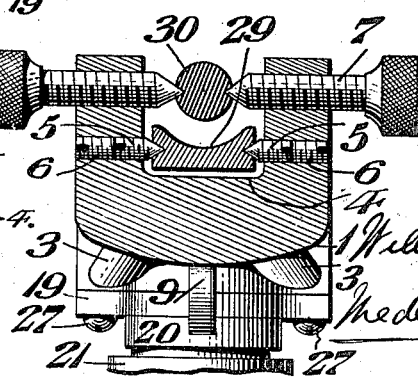
INVENTOR
William J. Tretch.
ATTORNEYS

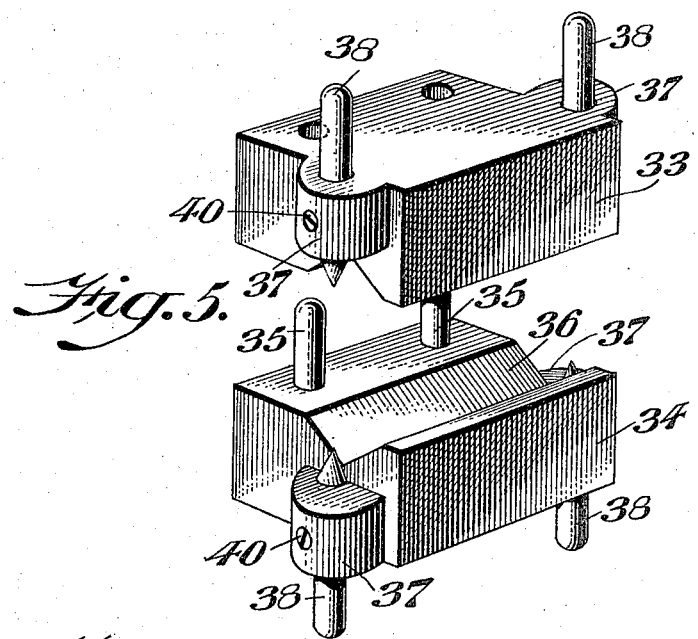
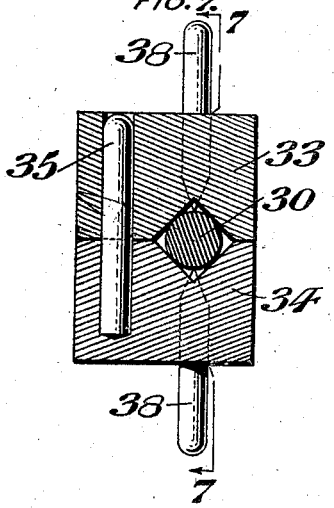
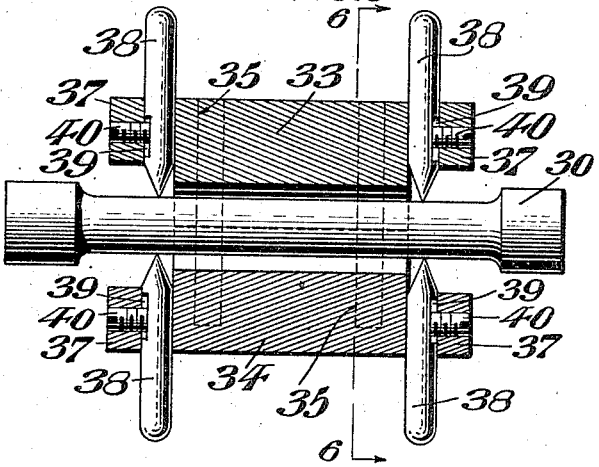

UNITED STATES PATENT OFFICE.

WILLIAM J. TRETCH, OF PHILADELPHIA, PENNSYLVANIA, ASSIGNOR TO RIEHLE BROS. TESTING MACHINE CO., OF PHILADELPHIA, PENNSYLVANIA, A CORPORATION OF PENNSYLVANIA.

EXTENSOMETER.

1,300,790.  Specification of Letters Patent.  Patented Apr. 15, 1919.

Application filed October 13, 1917. Serial No. 196,362.

*To all whom it may concern:*

Be it known that I, WILLIAM J. TRETCH, a citizen of the United States, residing in the city and county of Philadelphia, State of Pennsylvania, have invented a new and useful Extensometer, of which the following is a specification.

My invention consists of a novel extensometer for the measurement of deformations in materials under stress, and wherein provision is made for compensating for any variations in the amounts of strain that may occur in opposite sides of the specimen under examination.

A further object of my invention is to devise a novel construction and arrangement of a movable frame and a fixed frame, the movable frame being attached to the specimen to be stressed and being provided with an arm which rests against the plunger of an indicating dial.

A further object of my invention is to devise a novel manner of mounting the dial so that it may be readily adjusted so that the instrument will read correctly when it is calibrated.

A further object of my invention is to devise novel means for enabling the points of attachment to be brought the proper distance apart for the quick and convenient attachment of the extensometer to the specimen.

A further object of my invention is to devise a novel construction of a double pointed marking block whereby the specimen can be accurately and quickly marked the required distance apart ready to receive the extensometer.

Other objects and advantages of the invention and novel features of construction will hereinafter more clearly appear in the detailed description of the invention.

For the purpose of illustrating my invention, I have shown in the accompanying drawings a typical embodiment of it which is at present preferred by me, since this embodiment will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a front elevation of an extensometer embodying my invention, with certain of the fastening screws removed for the sake of clearness of illustration.

Fig. 2 represents a section on line 2—2 of Fig. 1.

Fig. 3 represents a section on line 3—3 of Fig. 2.

Fig. 4 represents a section on line 4—4 of Fig. 2.

Fig. 5 represents, in perspective, a marking device for the specimens.

Fig. 6 represents a section on line 6—6 of Fig. 7.

Fig. 7 represents a section on line 7—7 of Fig. 6.

Similar numerals of reference indicate corresponding parts.

Referring to the drawings:—

1 designates the top or movable frame and 2 designates the lower or swivel frame which is carried by a strut 3. The movable frame 1 comprises a yoke 4, the arms of which straddle the strut 3 and are fulcrumed thereon by means of the fulcrum pivots 5 and locking screws 6.

7 designates the specimen clamp screws which are in threaded engagement with the arms of the yoke 4 and are provided with cone-shaped ends to engage the walls of the apertures formed in the specimen by the marking device seen in Figs. 5 to 7 inclusive. The outer ends of the specimen clamp screws are enlarged and are preferably knurled in order to facilitate their adjustment. Extending from the yoke 4 and preferably integral therewith is an arm 8 which is provided with a ring or thumb piece 9. The strut 3 is bifurcated to permit the arm 8 to pass therethrough. The swivel frame 2 comprises a yoke 10, the arms of which carry the specimen clamp screws 11 which are constructed and arranged in a similar manner to the specimen clamp screws 7. The outer end of the yoke is provided with a threaded extension 12 and an annular shoulder 13 which is rotatable on the bearing face 14 on the under side of the strut 3. The strut is recessed on its top face, as indicated at 15, in order to adapt it to receive the lower frame nut 16 which engages the threaded extension 12 and bears against the shoulder or flange 17 so that a swivel connection is formed between the fixed frame and the strut.

18 designates an indicator cup which consists of a plate 19 having an annular flange 20 in which is securely held the annular base of the indicator 21 which may be of any desired or conventional construction and is provided with a dial 22 and a pointer 23. The pointer 23 is connected to a plunger 24 which passes through an aperture 25 in the plate 19 and an aperture 26 in the swivel frame so that the arm 8 bears against the end of such plunger. The plate 19 is secured to the strut 3 by means of fastening devices 27 which pass through the slots 28 in the plate 19 and into threaded engagement with the strut 3.

The slots 28 provide for the proper centering of the plunger 24 in the aperture 26. The strut 3 at its upper end is preferably recessed, as indicated at 29, in order that it will not interfere with the specimen 30 which is to be stressed. The upper end of the strut 3 is upwardly deflected, as indicated at 31, to form a clip. Such clip is preferably provided with an inward projection 32 to limit the movement of the movable frame. The movable frame is in the form of a bell crank lever pivoted to the strut and having its short arm attached to the specimen and its long arm resting against the plunger of the indicating dial.

A swivel connection between the fixed frame and the strut is employed to enable one to determine the stretch on both sides of the specimen. In many cases, a specimen is of harder material on one side than it is on the other, and due to this swivel action, such condition can be taken care of and the instrument is not strained and the exact stretch between the two points can be accurately determined.

Referring now to Figs. 5, 6 and 7, I will describe the double pointed marking block which is employed to accurately and quickly mark the specimen the required distance apart and at opposite ends of a diameter ready to receive the extensometer. This marking block comprises the block sections 33 and 34 which are alined with respect to each other by means of the dowel pins 35. Each block section is constructed in a similar manner and is provided with a V-shaped groove 36 and with the lugs or bosses 37 at each end through which pass the marking punches 38. Each punch 38 is provided with a longitudinally extending recess 39 into which extends a set screw 40 which is in threaded engagement with a lug or boss 37.

In the operation, the specimen to be stressed is first placed in the marking block, as seen in Fig. 7. The punches 38 are then driven toward the specimen so that at opposite ends it is marked at diametrically opposite points and the specimen is now ready to be placed in the extensometer. The operator grasps the clip 31 and the ring 9 with his thumb and forefinger so that when pressed together the points of attachment are brought the proper distance apart for quick and convenient attachment to the specimen by the clamp screws 7 and 11. It will be apparent that as the specimen is stressed and the distance between the clamp screws 7 and 11 changed, the bell crank lever or movable frame will multiply the motion and thus cause a properly constructed dial to indicate the amount of the movement.

It will now be apparent that I have devised a novel and useful extensometer, which embodies the features of advantage enumerated as desirable in the statement of the invention and the above discription, and while I have, in the present instance, shown and described a typical embodiment of it which will give in practice satisfactory and reliable results, it is to be understood that this embodiment is susceptible of modification in various particulars without departing from the spirit or scope of the invention or sacrificing any of its advantages.

Having thus described my invention, what I claim as new and desire to secure by Letters Patent, is:—

1. In an extensometer, in combination, a strut, a fixed frame carried by said strut, an indicator carried by said strut and provided with an actuating plunger, and a bell crank lever fulcrumed in said strut and having one arm provided with opposed specimen clamping members adapted to be connected to the specimen to be stressed and its other arm to engage said plunger.

2. In an extensometer, in combination, a strut, a fixed frame swiveled in it, an indicator carried by said strut and provided with an actuating plunger, and a bell crank lever fulcrumed in said strut and having one arm adapted to be connected to the specimen to be stressed and its other arm to engage said plunger.

3. In an extensometer, a strut, a fixed frame carried by said strut, an indicating device carried by said strut and provided with an actuating plunger, and a bell crank lever fulcrumed in said strut and having its short arm provided with opposed specimen clamping members adapted to be connected to the specimen and its long arm to engage said plunger.

4. In an extensometer, a strut, a fixed frame carried by said strut, means to secure said fixed frame to the specimen, a movable frame fulcrumed in said strut, means carried by said movable frame to clamp it to the specimen, and indicating mechanism carried by the strut and actuated by said movable frame.

5. In an extensometer, a strut, a fixed frame rotatably carried by said strut, means to secure said fixed frame to the specimen, a frame fulcrumed to said strut and having means to connect it to a specimen, and indicating mechanism carried by the strut and actuated by said frame.

6. In an extensometer, a strut, a fixed frame carried by said strut, means to secure said fixed frame to the specimen, a frame fulcrumed to said strut and having means to engage a specimen, and indicating mechanism adjustably mounted on said strut and actuated by said frame.

7. In an extensometer, a strut, a fixed frame swiveled therein, means to secure said fixed frame to the specimen, a bell crank lever fulcrumed in said strut and adapted to be connected to a specimen and provided with a finger engaging portion, and indicating mechanism carried by the strut and actuated by said bell crank lever.

8. In an extensometer, a strut, a fixed frame carried thereby, means to secure said fixed frame to the specimen, a bell crank lever fulcrumed in said strut and provided with means to engage a specimen and provided with a finger engaging portion, said strut having a clip thereon, and indicating mechanism carried by said strut and actuated by said bell crank lever.

9. In an extensometer, a strut, a fixed frame carried thereby at one end of the strut, means to secure said fixed frame to the specimen, a bell crank lever fulcrumed at the other end of said strut and having its short arm adapted to engage a specimen, said strut having a deflected portion to form a bearing for the thumb of the operator, said bell crank lever having a finger engaging portion, and indicating mechanism carried by said strut and actuated by the long arm of said bell crank lever.

10. In an extensometer, a strut, a fixed frame carried by it, means to secure said fixed frame to the specimen, a nut engaging said fixed frame to secure it in position, a support for indicating mechanism adjustably carried by said strut, indicating mechanism carried by said support and having an actuating plunger, and a bell crank lever fulcrumed in said strut and having its short arm adapted to be connected with the specimen and its long arm adapted to actuate said plunger.

11. In an extensometer, a strut, a fixed frame carried by it, means to secure said fixed frame to the specimen, a nut engaging said fixed frame to secure it in position, a support for indicating mechanism adjustably carried by said strut, indicating mechanism fastened to said support and having an actuating plunger, and a bell crank lever fulcrumed in said strut and having its short arm adapted to be connected with the specimen and its long arm adapted to actuate said plunger.

12. In an extensometer, a strut, a fixed frame swiveled therein, means to secure said fixed frame to the specimen, indicating mechanism carried by said strut and having an actuating plunger extending through said fixed frame, and a bell crank lever fulcrumed in said strut having its short arm adapted to be connected to the specimen and its long arm to engage said plunger.

13. In an extensometer, a strut, a fixed frame swiveled therein, means to secure said fixed frame to the specimen, indicating mechanism carried by said strut and having an actuating plunger extending through said fixed frame, and a bell crank lever fulcrumed in said strut having its short arm adapted to be connected to the specimen and its long arm passing through said strut and bearing against said plunger.

14. In an extensometer, a fixed frame comprising a yoke and a threaded extension, a strut in which said threaded extension is swiveled, clamping screws carried by said yoke, a bell crank lever having one end in the form of a yoke fulcrumed in said strut, clamping screws carried by the yoke of said bell crank lever, and indicating mechanism carried by said strut and actuated by said bell crank lever.

15. In an extensometer, a fixed frame comprising a yoke and a threaded extension, a strut in which said threaded extension is swiveled, diametrically opposed clamping screws carried by said yoke, a bell crank lever having one end in the form of a yoke fulcrumed in said strut, diametrically opposed clamping screws carried by the yoke of said bell crank lever, and indicating mechanism carried by said strut and actuated by said bell crank lever.

WILLIAM J. TRETCH.

Witnesses:
H. S. FAIRBANKS,
C. D. McVAY.